(12) United States Patent
Tian et al.

(10) Patent No.: US 12,547,342 B2
(45) Date of Patent: Feb. 10, 2026

(54) DISTRIBUTED DATA STORAGE CONTROL METHOD AND APPARATUS, AND ELECTRONIC DEVICE

(71) Applicant: Beijing Volcano Engine Technology Co., Ltd., Beijing (CN)

(72) Inventors: Yangfeng Tian, Beijing (CN); Jie Wang, Beijing (CN); Peng Li, Beijing (CN); Jinfeng Yang, Beijing (CN)

(73) Assignee: Beijing Volcano Engine Technology Co., Ltd., Beijing (CN)

( * ) Notice: Subject to any disclaimer, the term of this patent is extended or adjusted under 35 U.S.C. 154(b) by 0 days.

(21) Appl. No.: 18/908,395

(22) Filed: Oct. 7, 2024

(65) Prior Publication Data

US 2025/0217066 A1 Jul. 3, 2025

(30) Foreign Application Priority Data

Dec. 29, 2023 (CN) .......................... 202311873333.0

(51) Int. Cl.
G06F 3/06 (2006.01)
(52) U.S. Cl.
CPC .......... *G06F 3/0655* (2013.01); *G06F 3/0604* (2013.01); *G06F 3/067* (2013.01)
(58) Field of Classification Search
None
See application file for complete search history.

(56) References Cited

U.S. PATENT DOCUMENTS

| 6,173,293 | B1 | 1/2001 | Thekkath |
| 6,389,420 | B1 | 5/2002 | Vahalia |
| 2015/0356110 | A1 | 12/2015 | Lin |

FOREIGN PATENT DOCUMENTS

| CN | 108959407 A | 8/2020 |
| CN | 108959407 B | 8/2020 |
| CN | 110198346 B | 10/2020 |
| CN | 109375988 B | 7/2021 |
| CN | 116263778 A | 6/2023 |
| CN | 117931073 A | 4/2024 |

OTHER PUBLICATIONS

First Office Action issued in CN Appl. 202311873333.0 dated Nov. 13, 2025, English translation (10 pages).

*Primary Examiner* — Brian R Peugh

(57) ABSTRACT

A distributed data storage control method, including: receiving, through a proxy node, an access request for a target file in a NAS cluster, and determining target metadata corresponding to the access request; determining, based on metadata of the target file and distributed lock setting information, whether the target metadata needs to be synchronously valid with a distributed lock of the target metadata; when a determination is yes, if a current distributed lock of the target metadata is invalid, sending a first lock request to a distributed lock management and control node; configuring, through such node and in response to receiving the first lock request, the distributed lock of the target metadata for the access request, and returning response information to the proxy node; and controlling, based on the distributed lock of the target metadata, the access request for the target file in the NAS cluster.

20 Claims, 4 Drawing Sheets

DISTRIBUTED DATA STORAGE CONTROL METHOD AND APPARATUS, AND ELECTRONIC DEVICE

CROSS-REFERENCE TO RELATED APPLICATIONS

This application claims priority to Chinese Patent Application No. 202311873333.0, filed on Dec. 29, 2023, which is hereby incorporated by reference in its entirety.

TECHNICAL FIELD

Embodiments of the present disclosure relate to the field of Internet technologies, and in particular, to a distributed data storage control method and apparatus, and an electronic device.

BACKGROUND

A network attached storage (NAS) cluster may store and share files. The NAS cluster provides a function of accessing and managing stored files to a user through a network. An NAS device may be directly connected to an Ethernet, and a proxy node may be provided between the NAS cluster and a client. The proxy node may obtain data corresponding to a file from the NAS cluster, and the proxy node may cache the data corresponding to the file obtained from the NAS cluster. When the user obtains the above data through an access request, the proxy node may provide a service to the client from the cache.

Due to concurrency of accesses of the proxy node to the NAS cluster (including modification of file data in the NAS cluster), currently, there is a problem of inconsistency between data stored in the proxy node and data stored in the NAS cluster.

SUMMARY

Embodiments of the present disclosure provide a distributed data storage control method and apparatus, and an electronic device.

According to a first aspect, an embodiment of the present disclosure provides a distributed data storage control method. The method includes: receiving, through a proxy node, an access request for a target file in a network attached storage (NAS) cluster, and determining target metadata corresponding to the access request; determining, through the proxy node and based on metadata of the target file and distributed lock setting information, whether the target metadata needs to be synchronously valid with a distributed lock of the target metadata; when determining that the target metadata needs to be synchronously valid with the distributed lock of the target metadata, if the proxy node determines, according to an attribute value of the distributed lock of the target metadata, that a current distributed lock of the target metadata is invalid, sending a first lock request to a distributed lock management and control node, where the first lock request is used to request to reallocate a distributed lock of the target metadata for the target metadata, and the distributed lock of the target metadata is used to control exclusive access to the target metadata shared in the NAS cluster; configuring, through the distributed lock management and control node and in response to receiving the first lock request, the distributed lock of the target metadata for the access request, and returning response information to the proxy node, where the response information indicates that the distributed lock of the target metadata is successfully configured for the access request; and controlling, based on the distributed lock of the target metadata, the access request for the target file in the NAS cluster.

According to a second aspect, an embodiment of the present disclosure provides a distributed data storage control apparatus. The apparatus includes: a first receiving unit, configured to receive, through a proxy node, an access request for a target file in a network attached storage (NAS) cluster, and determine target metadata corresponding to the access request; a first determining unit, configured to determine, through the proxy node and based on metadata of the target file and distributed lock setting information, whether the target metadata needs to be synchronously valid with a distributed lock of the target metadata; a first sending unit, configured to: when determining that the target metadata needs to be synchronously valid with the distributed lock of the target metadata, if the proxy node determines, according to an attribute value of the distributed lock of the target metadata, that a current distributed lock of the target metadata is invalid, send a first lock request to the distributed lock management and control node, where the first lock request is used to request to reallocate a distributed lock of the target metadata and the distributed lock of the target metadata is used to control exclusive access to the target metadata shared in the NAS cluster; a first lock adding unit, configured to: configure, through the distributed lock management and control node and in response to receiving the first lock request, the distributed lock of the target metadata for the access request, and return response information to the proxy node, where the response information indicates that the distributed lock of the target metadata is successfully configured for the access request; and a first execution unit, configured to control, based on the distributed lock of the target metadata, the access request for the target file in the NAS cluster.

According to a third aspect, an embodiment of the present disclosure provides an electronic device. The electronic device includes: a processor and a memory. The memory stores a computer-executable instruction. The processor executes the computer-executable instruction stored in the memory, to enable the processor to execute the method according to the first aspect and various possible methods of the first aspect.

According to a fourth aspect, an embodiment of the present disclosure provides a computer-readable storage medium. The computer-readable storage medium stores a computer-executable instruction which, when executed by a processor, implements the method according to the first aspect and various possible methods of the first aspect.

According to a fifth aspect, an embodiment of the present disclosure provides a computer program product, including a computer program that, when executed by a processor, implements the method according to the first aspect and various possible methods of the first aspect.

The distributed data storage control method and apparatus, and the electronic device are provided in the present disclosure, an access request for a target file in a network attached storage (NAS) cluster is received through a proxy node, and target metadata corresponding to the access request is determined; it is determined whether the target metadata needs to be synchronously valid with a distributed lock of the target metadata through the proxy node and based on metadata of the target file and distributed lock setting information; when determining that the target metadata needs to be synchronously valid with the distributed lock of the target metadata, if the proxy node determines, according to an attribute value of the distributed lock of the target metadata, that a current distributed lock of the target metadata is invalid, a first lock request is sent to a distributed lock management and control node, where the first lock request is used to request to reallocate a distributed lock of the target metadata for the target metadata, and the distributed lock of the target metadata is used to control exclusive access to the target metadata shared in the NAS cluster; the distributed lock of the target metadata for the access request is configured through the distributed lock management and control node and in response to receiving the first lock request, and response information is returned to the proxy node, where the response information indicates that the distributed lock of the target metadata is successfully configured for the access request; and the access request for the target file in the NAS cluster is controlled based on the distributed lock of the target metadata. Therefore, a problem of inconsistency between metadata in a proxy node and metadata in a NAS cluster is solved. In addition, finely granularizing a distributed lock into a metadata distributed lock can improve concurrency of different accesses to different metadata in the NAS cluster.

BRIEF DESCRIPTION OF DRAWINGS

In order to more clearly describe technical solutions in embodiments of the present disclosure or in the prior art, the following briefly describes accompanying drawings for describing the embodiments or the prior art. Apparently, the accompanying drawings in the following description are some embodiments of the present disclosure, and a person of ordinary skill in the art may derive other accompanying drawings from these accompanying drawings without creative efforts.

DETAILED DESCRIPTION OF EMBODIMENTS

To make objectives, technical solutions, and advantages of embodiments of the present disclosure clearer, the following clearly and completely describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

Figure 1:
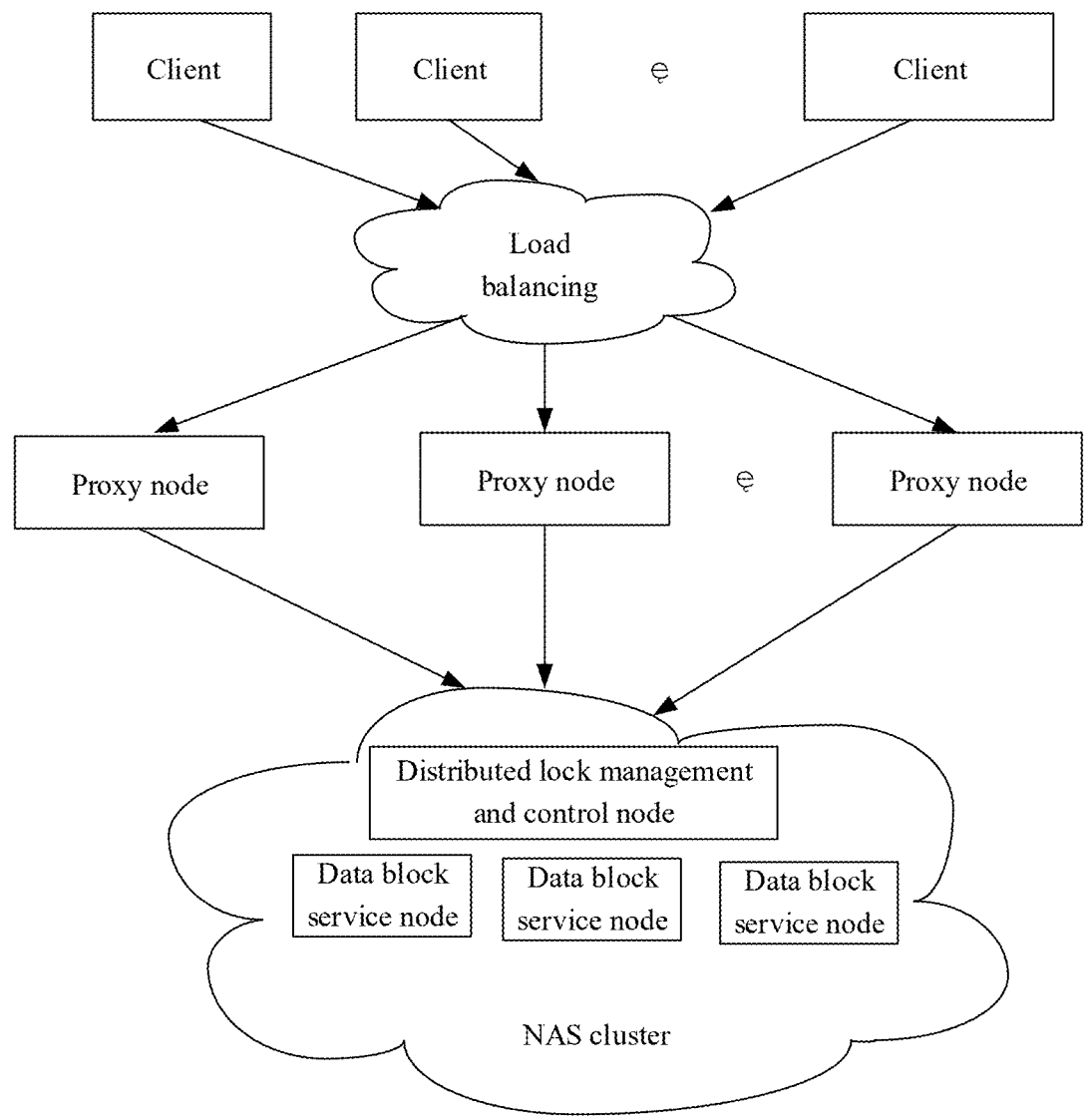
FIG. 1 is a schematic diagram of an application scenario.

Referring to FIG. 1, FIG. 1 is a schematic diagram of an application scenario. As shown in FIG. 1, a NAS cluster includes a plurality of data block service nodes (BlockServers, BS for short) and a distributed lock control node. In addition, a plurality of proxy nodes are provided between the NAS cluster and a plurality of clients. Each proxy node may receive access requests from a plurality of clients, and forward the access requests to the NAS cluster, thereby reducing pressure of concurrent access requests in the NAS cluster.

A file may include different file attributes, and the file attributes are also referred to as metadata. File metadata includes: size, a file open mode (mode), an owner identifier (user id, uid), a group identifier (group id, gid), an access control list (acl), a link external file attribute (link), an extended attribute (xattr), a last access time (atime), a last state change time (ctime), a last content modify time (last modify time), and the like.

The BS is responsible for reading and writing the file and storing file content. In some embodiments, the BS is also responsible for file size metadata and a modification time and a status modification time of the file.

An access request for a file includes but is not limited to: a creating file (create) request, a creating a directory (i.e., creating a folder; make directories, mkdir) request, a getting file attribute (Getattr) request, a setting file attribute (Setattr) request, a read request for reading file content (read), a write request for writing file content (write), and the like.

The above creat, mkdir, Getattr, Setatt, read, write, and the like for the file need to interact with the BS.

Metadata of a file may be cached in a current proxy node, to reduce excessive resource consumption of obtaining the file attribute from the NAS cluster. However, since file write operations may occur at any time in a distributed NAS cluster, metadata of the file cached in the proxy node may be inconsistent with metadata in the NAS cluster.

Therefore, currently, a problem that a proxy node occupies excessively high hardware resources and cannot guarantee consistency exists in the NAS cluster.

In the present disclosure, after receiving an access request for a file, the proxy node determines target metadata corresponding to the access request. If the target metadata needs to be synchronously valid with a distributed lock, a distributed lock management and control node configures a corresponding metadata distributed lock for the access request, and the proxy node accesses a target file according to the access request holding the metadata distributed lock. Due to mutual exclusion of the metadata distributed lock, target metadata of the target file obtained by the proxy node due to the access request is consistent with actual metadata in the NAS cluster, thereby solving the consistency problem.

Figure 2:
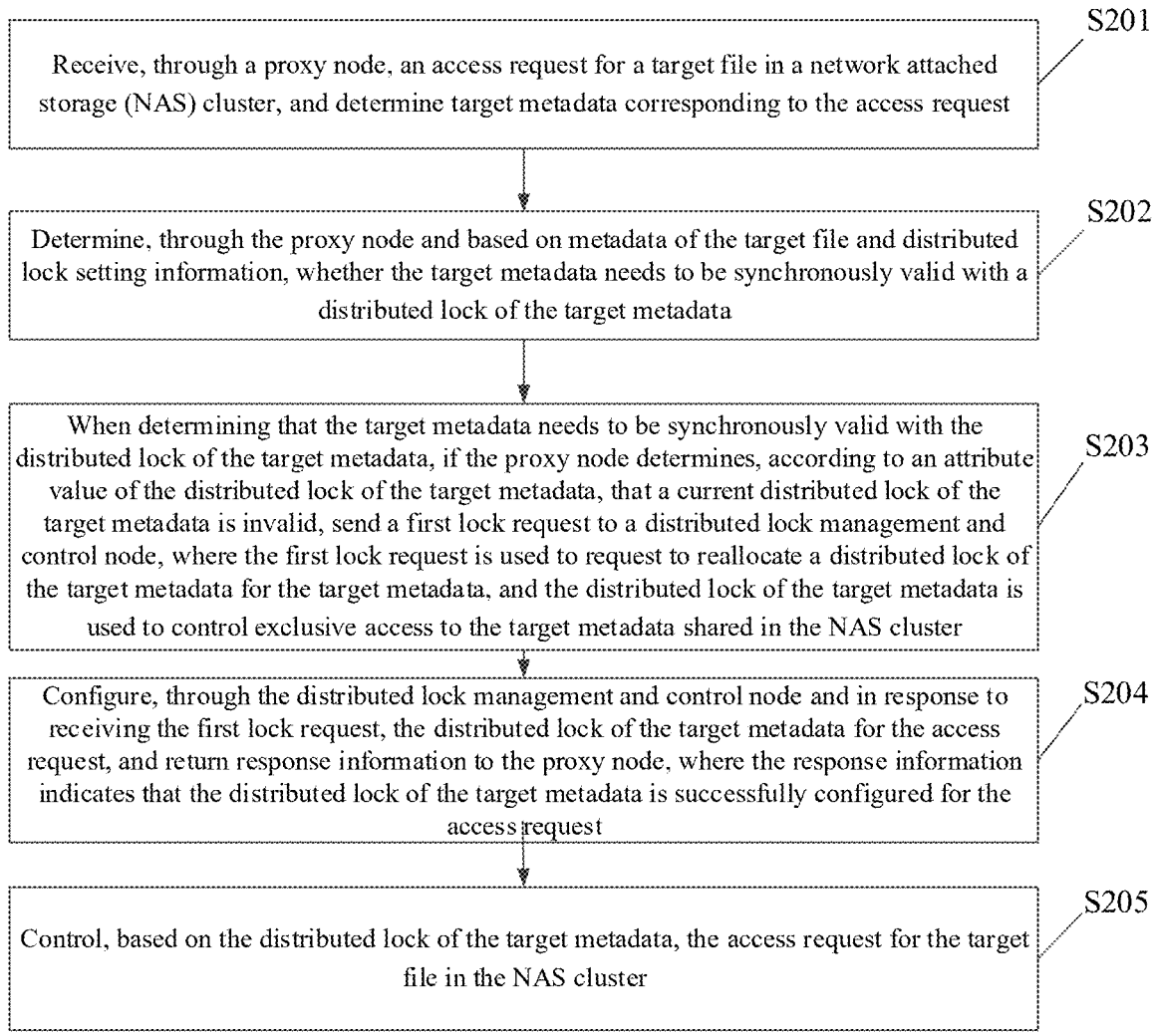
FIG. 2 is a first schematic flowchart of a distributed data storage control method according to an embodiment of the present disclosure.

Referring to FIG. 2, FIG. 2 is a first schematic flowchart of a distributed data storage control method according to an embodiment of the present disclosure. As shown in FIG. 2, the method includes the following steps.

S201: receive, through a proxy node, an access request for a target file in a network attached storage (NAS) cluster, and determine target metadata corresponding to the access request.

S202: determine, through the proxy node and based on metadata of the target file and distributed lock setting information, whether the target metadata needs to be synchronously valid with a distributed lock of the target metadata.

S203: when determining that the target metadata needs to be synchronously valid with the distributed lock of the target metadata, if the proxy node determines, according to an attribute value of the distributed lock of the target metadata, that a current distributed lock of the target metadata is invalid, send a first lock request to a distributed lock management and control node, where the first lock request is used to request to reallocate a distributed lock of the target metadata for the target metadata, and the distributed lock of the target metadata is used to control exclusive access to the target metadata shared in the NAS cluster.

S204: configure, through the distributed lock management and control node and in response to receiving the first lock request, the distributed lock of the target metadata for the access request, and return response information to the proxy node, where the response information indicates that the distributed lock of the target metadata is successfully configured for the access request.

S205: control, based on the distributed lock of the target metadata, the access request for the target file in the NAS cluster.

In the present disclosure, the NAS cluster may include a BS node and a distributed lock management and control node. A quantity of the BS nodes may be multiple. The distributed lock management and control node may include a plurality of distributed lock management and control nodes in a primary/backup mode. The distributed lock management and control node may be responsible for allocating and managing a metadata distributed lock. In addition, metadata information of a file in the NAS cluster is stored in the distributed lock management and control node.

A plurality of proxy nodes may be provided between the NAS cluster and a plurality of clients. Each proxy node may be allocated with access requests of a plurality of clients for the NAS cluster in a load balancing manner.

The proxy node herein may be any one of the plurality of proxy nodes. The target file may be any one of a plurality of files providing a sharing service in the NAS cluster.

The access request may be an access request from a client.

The access request from the client may request to perform any operation on a file in the NAS cluster, for example, a write operation on file content, a read operation on the file content, a read operation on metadata of the file, and the like.

After receiving the access request from the client, the proxy node may determine target metadata corresponding to the access request.

Different access requests may be related to different metadata. For example, a write request for writing file content of a target file or a read request for reading the file content is related to size metadata of the target file. For another example, an access request for obtaining a modification time (mtime) of a file corresponds to mtime metadata.

Each access request may be related to one or more pieces of metadata. For example, the access request may specify to read or modify a specific piece of metadata or some specific pieces of metadata of a file. For another example, a write operation and a read operation on file content are usually related to file size metadata and modification time metadata of the target file.

In other words, the target metadata may be explicitly indicated in the access request, or the target metadata corresponding to the access request may be determined based on an operation that is to be performed on the target file according to the access request.

After the target metadata corresponding to the access request is determined, it may be determined whether the target metadata needs to be synchronously valid with a distributed lock. The metadata needs to be synchronously valid with the distributed lock. During a period when the distributed lock is valid, target data obtained by using the distributed lock is valid. After the distributed lock is revoked, the metadata obtained by using the distributed lock is invalid.

A proxy node (proxy) may store metadata of a file and distributed lock setting information. The setting information includes metadata distributed locks corresponding to different pieces of metadata and information of whether different metadata needing to be synchronously valid with the corresponding metadata distributed locks.

After determining the target metadata related to the access request, the proxy node may determine, based on the metadata that is locally stored and the distributed lock setting information, the distributed lock of the target metadata corresponding to the target metadata and whether the target metadata needs to be synchronously valid with the distributed lock of the target metadata.

After the target metadata is determined to need to be synchronously valid with the distributed lock of the target metadata, the proxy node may determine whether the current distributed lock of the target metadata of the proxy node itself is valid. Whether the distributed lock of the target metadata of the proxy node is valid may be determined based on an attribute value of the distributed lock of the target metadata. The attribute value of the distributed lock of the target metadata includes valid or invalid.

If the distributed lock of the target metadata of the proxy node is valid, step S205 may be performed.

Otherwise, the proxy node needs to send a first lock request to the distributed lock management and control node. The first lock request is used to request the distributed lock management and control node to configure a distributed lock for the access request, and the first lock request may include information about the distributed lock of the target metadata. After receiving the first lock request, the distributed lock management and control node detects whether there is an existing lock that is mutually exclusive with the requested distributed lock of the target metadata. If there is an existing lock that is mutually exclusive with the requested distributed lock of the target metadata, the distributed lock management and control node may send a revocation request for the existing lock to other proxy node holding the existing lock. After receiving the revocation request, the proxy node holding the existing lock responds to the revocation request and destroys the local existing lock. After revoking the existing lock, the distributed lock management and control node may configure a corresponding distributed lock of the target metadata for the access request.

To improve concurrency, different metadata distributed locks may be preset, and the different metadata distributed locks correspond to different groups of metadata. The different metadata distributed locks include:

a distributed lock of file size metadata, a distributed lock of file permission metadata, a distributed lock of hard link metadata, a distributed lock of directory modification time metadata, and a distributed lock of file extended attribute metadata, where each metadata distributed lock corresponds to one group of metadata.

Each group of metadata includes one or more pieces of metadata. The metadata grouping includes: file size metadata, file permission metadata, directory and file hard link metadata, directory modification time metadata, and file extended attribute metadata.

A file size group includes file size metadata. A file permission metadata group includes metadata such as mode, uid, gid, and acl. The metadata belongs to metadata with a relatively low modification frequency, and the metadata is related to file permission (AUTH). Therefore, the metadata may belong to an AUTH group, and the distributed lock of file permission metadata (AUTH_LOCK) is uniformly used to ensure consistency. A directory and file hard link metadata group includes directory and file hard link metadata, and a hard link metadata distributed lock (LINK_LOCK) is used to ensure consistency of hard links of a directory and a file.

A directory modification time metadata group may include directory modification time metadata, and a directory modification time metadata lock (DIR_MTIME_LOCK) is used to ensure consistency of mtime of the directory. A file extended metadata group includes file extended metadata (XATTR), and a file extended attribute metadata lock (XATTR_LOCK) is used to ensure consistency of the file extended metadata.

In these embodiments, the different metadata distributed locks are set, and the different metadata distributed locks correspond to the different groups of metadata, so that it can be ensured that each group of metadata in the NAS cluster is consistent with each group of metadata cached in the proxy node, respectively. In addition, different proxy nodes may concurrently access different groups of metadata in the NAS cluster based on different metadata distributed locks, so that concurrency of the NAS cluster can be improved.

After configuring the corresponding distributed lock of the target metadata for the access request, the distributed lock management and control node may send response information to the proxy node. The response information indicates that the corresponding distributed lock of the target metadata is successfully added for the access request, that is, the proxy node holds the distributed lock of the target metadata corresponding to the access request. After holding the distributed lock of the target metadata, the proxy node may perform an operation related to the target metadata in the access request on the target file in the NAS cluster.

In a distributed system, a distributed lock is used to control exclusive access to shared metadata in an NAS cluster, to protect consistency of distributed caches between different proxy nodes. In this embodiment, the metadata distributed lock and the metadata are synchronously valid. When a distributed lock of a proxy node is valid, the proxy node may cache the metadata. When the distributed lock of the proxy node is valid, the cached metadata is valid. When the distributed lock of the proxy node is invalid, the cached metadata may be cleared.

For an access request for modifying metadata of a target file, in this embodiment, the distributed lock of the target metadata ensures mutual exclusion of access requests for accessing the target metadata of the target file at different proxy nodes at a same moment. In other words, the distributed lock of the target metadata can ensure that, among a plurality of access requests for the target metadata of the target file at different nodes, only one access request is valid at a same moment, that is, the access request with the distributed lock of the target metadata is valid.

The proxy node sends the access request to the NAS cluster according to the held distributed lock of the target metadata, to complete an operation corresponding to the target file directly according to the access request. If the NAS cluster updates the target metadata according to the operation, after the operation is completed, the proxy node may obtain the updated target metadata from the NAS cluster, and cache the target metadata locally at the proxy node. If the NAS cluster does not update the target metadata of the target file according to the access request, the proxy node may obtain the target metadata from the NAS cluster (the distributed lock management and control node), and store the held distributed lock of the target metadata and the obtained target metadata in association.

The proxy node may store the held distributed lock of the target metadata and the target metadata obtained according to the distributed lock of the target metadata in association. When a subsequent access request from a client needs to obtain the target metadata, the target metadata that is locally cached may be sent to the client, thereby reducing resource consumption of the NAS cluster in processing the access request.

After receiving a revocation request for revoking the distributed lock of the target metadata, the proxy node may invalidate the local distributed lock of the target metadata, and clear the target metadata that is locally cached at the same time.

For example, a file size metadata obtaining request for obtaining file size metadata of a file is used. A proxy node 1 sends a distributed read lock request of the file size metadata to a distributed lock management and control node through the request, and the distributed lock management and control node may configure a distributed lock of the file size metadata for the file size metadata obtaining request of the proxy node 1. The proxy node 1 obtains the file size metadata from the distributed lock management and control node according to the file size metadata obtaining request configured with a distributed lock of the file size metadata. The proxy node 1 stores the file size metadata and the distributed lock of the file size metadata in association in a cache. When the proxy node 1 subsequently receives an access request from a client and wants to obtain target metadata of the target file, the proxy node 1 may check whether the distributed lock of the file size metadata in the cache is valid. If the distributed lock of the file size metadata in the cache is valid, the file size metadata stored in the cache is directly used. When another proxy node 2 attempts to modify the file size metadata of the target file, the distributed lock management and control node revokes the distributed lock of the file size metadata of the proxy node 1. After receiving the revocation request from the distributed lock management and control node, the proxy node 1 needs to clear the distributed lock of the file size metadata and the file size metadata stored in association in the cache. When subsequently receiving an access request from the client that needs the file size metadata, the proxy node 1 needs to reapply to the distributed lock management and control node for a distributed lock of the file size metadata.

The proxy node synchronously validates the target metadata and the distributed lock of the target metadata, so that the target metadata cached at the proxy node is valid during a period when the distributed lock of the target metadata is valid. After the distributed lock of the target metadata of the proxy node is revoked, the distributed lock of the target metadata may be held by another proxy node, and the target metadata in the NAS cluster may be changed. Therefore, after the distributed lock of the target metadata is revoked, the target metadata obtained based on the distributed lock of the target metadata also needs to be cleared, so that it can be ensured that the target metadata in the proxy node is consistent with target metadata in the NAS cluster.

In this embodiment, for the target metadata that needs to be synchronously valid with the distributed lock of the target metadata, when an access request related to the target metadata needs to be executed, if the local distributed lock of the target metadata is invalid, a distributed lock of the metadata needs to be applied for from the distributed lock management and control node. After the distributed lock of the target metadata of the proxy node is revoked, the target metadata obtained by the proxy node is also invalid, so that consistency of the target metadata in the proxy node and the target metadata in the NAS cluster can be ensured.

In some embodiments, the method further includes:

in response to updating of the target metadata by an operation corresponding to the access request, caching, through the proxy node, the updated target metadata, and synchronizing the updated target metadata to the distributed lock management and control node, where the distributed lock management and control node stores metadata of the target file.

In the related art, file size and a modification time (mtime) of a file are stored in a BS. When file content is written to a BS node, the file content to be written is usually divided into a plurality of segments (segment), and one BS is allocated to each segment. It is assumed that the file content is divided into 16 segments, and each of the 16 segments is written to a corresponding BS, that is, the file is written to 16 BSs according to different segments. For example, [0 M, 2 M) of the file is written to BS1, [2 M, 4 M) is written to BS2, [4 M, 6 M) is written to BS3, . . . , and [14 M, 16 M) is written to BS16. A file size that is stored in each BS may be a size interval of the file written to the BS, for example, a file size interval [0 M, 2 M) stored in BS1, and a modification time t1 of the size interval. For one file, only one BS records a final size of the file. However, since it is not known in which BS the last interval of the file is recorded, when receiving an access request for obtaining a file size, a proxy node needs to send a file size obtaining request to a plurality of BSs corresponding to the file, and then receive a file size and a modification time returned from each BS. The proxy node may determine a maximum value from the plurality of returned file sizes, and use the maximum value as the file size. Therefore, the proxy node sends a relatively large quantity of file size obtaining requests, and resource consumption of the proxy node and the NAS cluster is relatively large. If a response to file size obtaining of one or more of the plurality of BSs has a long-tail delay, an entire request is slowed down. In other words, resource consumption of the proxy node and the NAS cluster in responding to a metadata obtaining request from a client is excessive.

In this embodiment, the distributed lock management and control node of the NAS cluster stores all metadata of the file in the NAS cluster. In other words, file size metadata and modification time metadata that are originally recorded by the BS are also transferred to the distributed lock management and control node for storing. In this way, when the proxy node obtains information about any metadata of the target file, the proxy node does not need to interact with the BS, so that it can be avoided that the proxy node needs to access a plurality of BSs to obtain accurate information about the metadata due to different parts of the same metadata of the file being distributed in different BSs. This can reduce a quantity of access requests that the proxy node needs to send to obtain the metadata, thereby reducing resource consumption of the proxy node, and can also reduce a total quantity of access requests received and processed by the NAS cluster, thereby reducing resource consumption of the NAS cluster on the whole.

In addition, the distributed lock management and control node is also responsible for configuring a metadata distributed lock for each access request and revoking a configured metadata distributed lock. After receiving an access request related to target metadata of a file, the proxy node may apply to the distributed lock management and control node for a distributed lock of the target metadata related to the access request. Since the distributed lock management and control node is responsible for configuration and revocation of the metadata distributed lock, there is no need to separately set a service node for a distributed lock service. In addition, since all metadata of the file is stored in the distributed lock management and control node, when performing a read request for the target metadata stored in the distributed lock management and control node, only the target metadata of the file needs to be obtained from the distributed lock management and control node, and there is no need to access a plurality of BSs to obtain the target metadata of the file. This can reduce a total quantity of requests sent by the proxy node to the NAS cluster, thereby reducing total resource consumption of the proxy node and the NAS cluster.

In addition, due to a file update visibility requirement, that is, when a client opens a file, the client can obtain a latest version of the file, the proxy node needs to return latest file attributes of the target file when receiving an open request for the target file that is sent by the client, that is, a close to open (CTO) semantic. Since the distributed lock management and control node stores all metadata of the shared file in the NAS cluster, and a total quantity of requests sent by the proxy node to the NAS cluster is reduced, the proxy node can have more resources to meet the update visibility requirement.

In some embodiments, the method further includes the following content:

in response to determining that the target metadata does not need to be synchronously valid with the distributed lock of the target metadata, generating, through the proxy node, reply information for the access request from the target metadata that is locally cached, where the target metadata that is locally cached is updated periodically.

In this embodiment, the metadata that does not need to be synchronously valid with the distributed lock of the target metadata may be metadata of a file with a relatively high modification frequency and a relatively low priority.

Illustratively, the metadata that does not need to be synchronously valid with the distributed lock of the target metadata includes an access time (Access Time), a modification time (Modification Time), a change time (Change Time), and the like.

The target metadata may be any one or more of the access time (Access Time), the modification time (Modification Time), and the change time (Change Time).

In these embodiments, for the metadata that does not need to be synchronously valid with the distributed lock of the target metadata, after the metadata distributed lock of the metadata is revoked, the metadata obtained by the proxy node through the metadata distributed lock may still be valid. An effective time of the metadata may be set. If the proxy node detects that a duration for which the proxy node continuously stores the metadata exceeds a preset duration, the proxy node invalidates the metadata that is locally stored, and automatically obtains the metadata from the distributed lock management and control node. In other words, the proxy node updates the metadata periodically, to ensure that the metadata is consistent with the metadata in the distributed lock management and control node. This can reduce resource consumption caused by frequent configuration and revocation of metadata distributed locks to the distributed lock management and control node.

In some embodiments, step S203 includes: if the access request does not directly or indirectly update a file size of the target file, send a first lock request for requesting a distributed read lock of the target metadata to the distributed lock management and control node.

The target metadata corresponding to the access request here may be any metadata that needs to be synchronously valid with the distributed lock of the target metadata. After determining that the file size of the target file is not updated, the proxy node may determine that the distributed lock of the target metadata is a distributed read lock of the target metadata. The proxy node may request a distributed read lock of the target metadata from the distributed lock management and control node for the access request. For metadata distributed locks corresponding to the same metadata, metadata distributed read locks are compatible with each other, and a metadata distributed write lock is mutually exclusive with metadata distributed write locks and metadata distributed read locks.

Taking AUTH group metadata as an example, when a proxy node 1 modifies file mode metadata and applies to a distributed lock management and control node for an AUTH write lock, the distributed lock management and control node revokes an AUTH read lock of a proxy node 2. Then, when the proxy node 2 wants to obtain the mode metadata, the proxy node 2 needs to reapply for an AUTH read lock. The distributed lock management and control node revokes a AUTH write lock of the proxy node 1. If the proxy node 1 needs the mode file size metadata next time, the proxy node 1 needs to apply to the distributed lock management and control node for an AUTH read lock again. A total of five lock interactions are involved in the entire process, the process is too cumbersome, and metadata request performance is reduced.

For an access request that does not update the file size, using a metadata distributed read lock corresponding to the metadata corresponding to the access request can improve resource consumption caused by invalid lock interactions.

In some embodiments, step S203 includes:
in response to determining that the access request directly or indirectly changes a file size of the target file, send a first lock request for requesting a write lock of file size metadata to the distributed lock management and control node. The first lock request is used to request a distributed write lock of the file size metadata.

File size (size) metadata is the most important attribute of a file and has a relatively high modification frequency. A distributed lock of the file size metadata (size lock) may be set for the file. A type of the distributed lock of the file size metadata may include a read lock and a write lock.

Since an operation on the file size involves an operation on file content in a BS, the write lock and the read lock are set for the distributed lock of the file size metadata.

Specifically, a type of the size lock may be determined based on whether an access request directly or indirectly changes file size metadata of the target file. For example, when the operation is an operation that needs to modify the file content, it may be determined that the size lock is the write lock (that is, the distributed write lock of the file size metadata). If the operation is an operation that needs to read the file content, it may be determined that the size lock is the read lock (that is, the distributed read lock of the file size metadata).

The distributed write lock of the metadata is mutually exclusive with other metadata locks (the write lock is mutually exclusive with the write lock, and the write lock is mutually exclusive with the read lock), to ensure that only one access request for the file size metadata by one proxy node is valid at a same moment.

The access request for changing the file size metadata of the target file is an append write request for adding new content to the target file, or a metadata update request for updating the file size metadata.

When initiating the append write request or the file size metadata update request, the proxy node needs to apply to the distributed lock management and control node for the write lock of the file size metadata.

The foregoing operations modify the file size, and then the write lock of the file size metadata needs to be held. After receiving a request from the proxy node for applying for the write lock of the file size metadata, the distributed lock management and control node first revokes a read lock or a write lock allocated to other proxy node, and then configures the write lock of the file size metadata for the proxy node. Since the proxy node holding the write lock of the file size metadata modifies the file size metadata, and updates a modification time and a status change time, when the file size metadata is updated, the latest file size metadata, the modification time and the status change time need to be synchronized to the distributed lock management and control node.

A proxy node 1 holds a distributed write lock of file size metadata. If a proxy node 2 applies to a distributed lock management and control node for a distributed read lock of file size metadata, the distributed lock management and control node revokes the distributed write lock of the file size metadata held by the proxy node 1, and allocates the distributed read lock of the file size metadata to the proxy node 2. In the present application, that the proxy node holding the distributed lock means that the distributed lock of the proxy node is valid.

If the proxy node 1 holds a distributed read lock of the file size metadata, and the proxy node 2 applies for a distributed write lock of the file size metadata: the distributed lock management and control node revokes the distributed read lock of the file size metadata held by the proxy node 1, and allocates a distributed write lock of the file size metadata to the proxy node 2.

If the proxy node 1 holds a distributed write lock of the file size metadata, and the proxy node 2 applies for a distributed write lock of the file size metadata: the distributed lock management and control node revokes the distributed write lock of the file size metadata held by the proxy node 1, and allocates a distributed write lock of the file size metadata to the proxy node 2.

If file size metadata of the target file is updated according to the access request, the write lock of the file size metadata is configured for the access request. Due to mutual exclusion of different distributed locks of the file size metadata, it can be ensured that only one of access requests of a plurality of proxy nodes that directly or indirectly update the file size metadata is valid, thereby ensuring consistency of the file size metadata in the proxy node and the NAS cluster.

In some embodiments, the access request is a read request indicating to read target file content, and the distributed lock of the target metadata is a distributed read lock of the file size metadata. Before step S205, the method further includes the following steps:
first, detecting whether an access range indicated by the read request exceeds a file size of the target file; and
then, in response to detecting that the access range exceeds the file size of the target file, modifying the access range corresponding to the access request, such that a modified access range falls within the file size of the target file.

For the read request for reading the target file content, the request may include an access range of the target file content to be read. The access range may include, for example, a start offset and a size to be read. The start offset here may be an offset relative to a start point of the entire file of the target file. For example, the start offset may be 2 M. The size to be read may be a length of the file content to be read. Illustratively, the start offset may be 2 M, and the size to be read may be 5 M. The access range to be read may be [2 M, 7 M] file content of the target file.

The proxy node may obtain the file size of the target file from the distributed lock management and control node. Taking the access request requesting to access [2 M, 7 M] content of the target file as an example, if the file size of the target file obtained from the distributed lock management and control node is 8 M, the access request does not exceed the file size of the target file. The proxy node may send an access request for reading [2 M, 7 M] content of the target file to a BS of the NAS cluster. If the size of the target file obtained from the distributed lock management and control node is 6 M, a range corresponding to the access request exceeds the file size of the target file. The proxy node resets an upper limit of the access range in the access request. For example, the access range is reset from [2 M, 7 M] to [2 M, 6 M].

In these embodiments, the access range of the read access request that exceeds the file size is adjusted by the proxy node, so that the access request is not invalid due to exceeding the size, and response efficiency of the access request can be improved.

Figure 3:
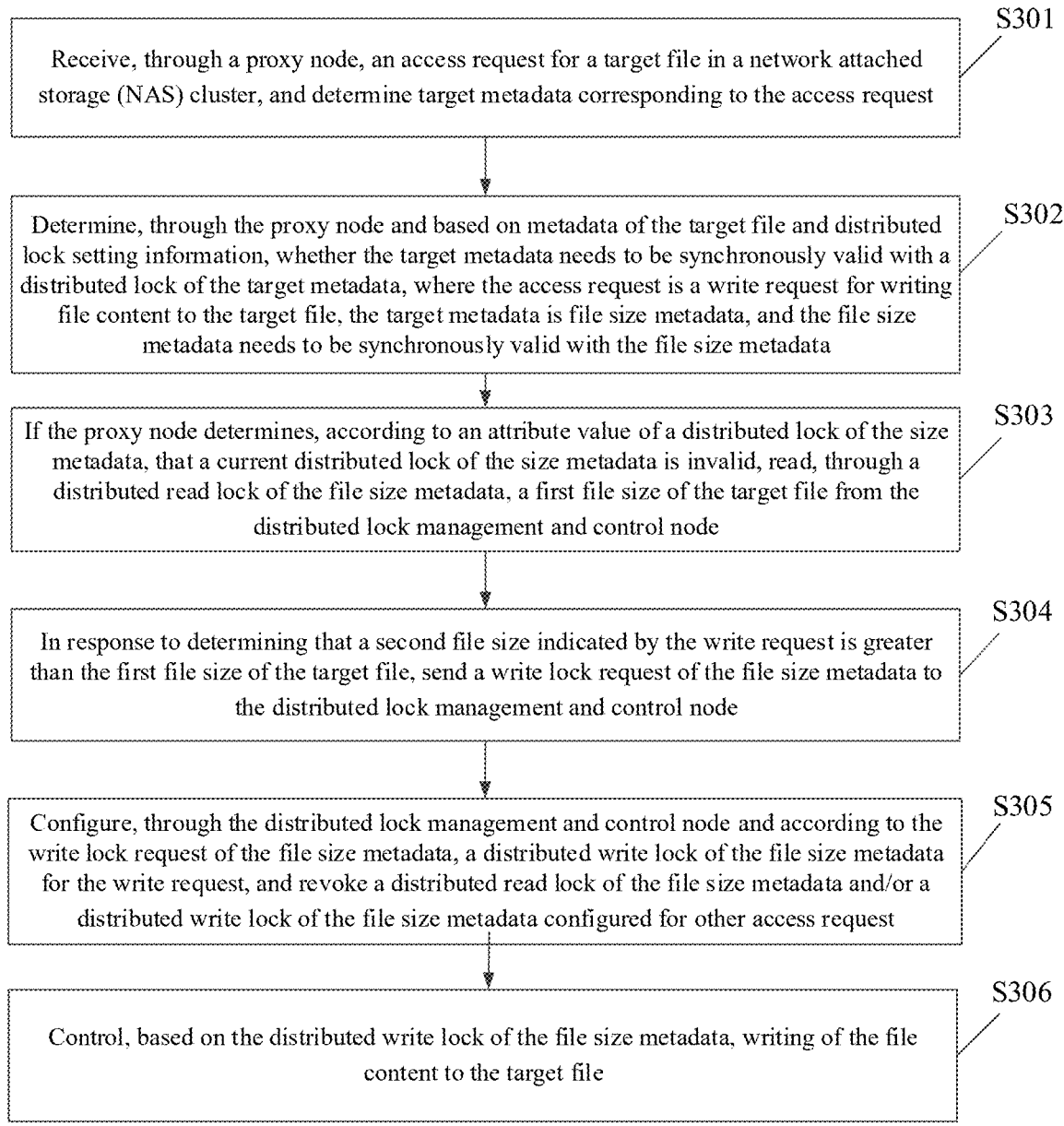
FIG. 3 is a second schematic flowchart of a distributed data storage control method according to an embodiment of the present disclosure.

Referring to FIG. 3, FIG. 3 is a second schematic flowchart of a distributed data storage control method according to an embodiment of the present disclosure. As shown in FIG. 3, the method includes the following steps.

S301: receive, through a proxy node, an access request for a target file in a network attached storage (NAS) cluster, and determine target metadata corresponding to the access request.

S302: determine, through the proxy node and based on metadata of the target file and distributed lock setting information, whether the target metadata needs to be synchronously valid with a distributed lock of the target metadata, where the access request is a write request for writing file content to the target file, the target metadata is file size metadata, and the file size metadata needs to be synchronously valid with a distributed lock of the file size metadata.

S303: if the proxy node determines, according to an attribute value of a distributed lock of the file size metadata, that a current distributed lock of the file size metadata is invalid, read, through a distributed read lock of the file size metadata, a first file size of the target file from the distributed lock management and control node.

S304: in response to determining that a second file size indicated by the write request is greater than the first file size of the target file, send a write lock request of the file size metadata to the distributed lock management and control node.

S305: configure, through the distributed lock management and control node and according to the write lock request of the file size metadata, a distributed write lock of the file size metadata for the write request, and revoke a distributed read lock of the file size metadata and/or a distributed write lock of the file size metadata configured for other access request.

S306: control, based on the distributed write lock of the file size metadata, writing of the file content to the target file.

After receiving the access request, the proxy node determines that the access request is the write request for writing the file content to the target file. Then, the proxy node may first check whether a distributed read lock of the file size metadata is held. If the distributed read lock of the file size metadata is not held, the proxy node applies to the distributed lock management and control node for the distributed read lock of the file size metadata. After the distributed read lock of the file size metadata is held, the proxy node may obtain the first file size from the distributed lock management and control node. Then, the proxy node determines, based on the second file size corresponding to the write request and the obtained first file size, whether the write request is an append write request.

If the second file size indicated by the write request is greater than the second file size obtained from the distributed lock management and control node, the write request is the append write request. The append write request changes the file size of the target file, and a distributed write lock of the file size metadata needs to be added to the write request. In other words, a distributed lock of the file size metadata (including a read lock and a write lock) that is configured for an access request of other proxy node needs to be revoked, and then the distributed write lock of the file size metadata is added to the access request, so that it can be ensured that after the file size of the target file is indirectly changed, there is only one valid file size in the NAS cluster and the proxy node.

In some embodiments, the access request requests to overwrite existing content of the target file, and the access request is an overwrite request. The overwrite request does not modify the file size metadata, and therefore a distributed write lock of the file size metadata does not need to be added for the overwrite access request.

For the overwrite access request, a distributed read lock of the file size metadata that is held is used to overwrite the existing content of the target file with file content corresponding to the overwrite access request according to a range indicated by the overwrite access request.

In some embodiments, the methods shown in FIG. 2 and FIG. 3 further include:

first, determining, through the proxy node and according to the response information, a lock identifier of the distributed lock of the target metadata, where lock identifiers of different distributed locks of the target metadata are incremented in an order in which the distributed locks of the target metadata are configured;

second, determining whether the lock identifier of the distributed lock of the target metadata is less than a lock identifier of a distributed lock of the target metadata that is held; and last, if the lock identifier of the distributed lock of the target metadata is less than the lock identifier of the distributed lock of the target metadata that is held, discarding the distributed lock of the target metadata indicated by the response information.

For the same metadata, the distributed lock management and control node may allocate a distributed lock of the target metadata to different distributed lock requests of the target metadata of the same proxy node, and send response information of each lock request to the proxy node. Due to reasons such as network congestion, response information that the distributed lock management and control node successfully configures the distributed lock of the target metadata for different lock requests may be received by the proxy node in disorder. If the proxy node requests an AUTH read lock, the distributed lock management and control node returns a current AUTH read lock 1, but the AUTH read lock 1 has not been sent to the proxy node due to network congestion. In the meantime, a concurrent access request of the proxy node completes a modification of mode metadata once, and the proxy node has cached an AUTH read lock 2. At this point, the proxy node receives response information indicating that the AUTH read lock 1 is successfully added. The proxy node may process the response information, and the AUTH read lock 1 stored in the proxy node covers the AUTH read lock 2, that is, an old lock covers a new lock in the proxy node.

To prevent the problem that the old lock of the proxy node covers the new lock of the proxy node, the distributed lock management and control node allocates a lock identifier to each distributed lock of the target metadata. Lock identifiers of different distributed locks of the same target metadata are incremented in an order in which the distributed locks are configured. For example, the distributed lock management and control node allocates a lock identifier to the distributed lock of the target metadata based on a timestamp. Whether the distributed lock of the target metadata corresponding to the response information sent by the distributed lock management and control node is a new lock or an old lock may be determined based on the lock identifier. For newly received response information of the old lock, the newly received response information may be discarded, to avoid a problem that the old distributed lock of the target metadata replaces the new distributed lock of the target metadata in the proxy node, which results in inconsistency between the target metadata in the proxy node and actual target metadata in the NAS cluster.

In some embodiments, the methods shown in FIG. 2 and FIG. 3 further include:

in response to receiving the response information, determine, through the proxy node and according to a lock identifier of the distributed lock of the target metadata indicated by the response information, whether the distributed lock of the target metadata is a distributed lock of the target metadata that is revoked.

Second, if a determination result is yes, discard the distributed lock of the target metadata.

Due to reasons such as network congestion, response information, that a distributed lock management and control node sends to different proxy nodes, for a distributed read lock request for the same target metadata may be out of order, which may further lead to inconsistency between distributed lock records of the same target metadata in the proxy node and the distributed lock management and control node. For example, the distributed lock management and control node allocates an AUTH read lock to a proxy node 1 and sends to the proxy node 1 response information indicating that the AUTH read lock is successfully allocated to the proxy node 1. Then, a proxy node 2 initiates a metadata update request for updating mode metadata to the distributed lock management and control node, to update the mode metadata, and the distributed lock management and control node sends a revocation request to the proxy node 1 to revoke the AUTH read lock of the proxy node 1. However, the distributed lock management and control node cannot ensure which one of the response information indicating that the distributed lock is successfully allocated to the proxy node 1 and the revocation request arrives at the proxy node 1 first. If the proxy node 1 first receives the revocation request, and then receives the response information indicating that the lock is successfully added, the proxy node 1 stores an old AUTH read lock. However, the AUTH read lock of the proxy node 1 that is recorded in the distributed lock management and control node has been revoked, and there is no AUTH read lock in the proxy node 1. Therefore, a new AUTH read lock is reallocated to the proxy node 2, resulting in inconsistency between the metadata distributed lock held by the proxy node 1 and the metadata distributed lock stored in the distributed lock management and control node.

To solve the problem of inconsistency between the distributed lock of the target metadata held by the proxy node 1 and the distributed lock of the target metadata stored in the distributed lock management and control node caused by the foregoing reasons, the proxy node needs to store a lock identifier of the distributed lock of the target metadata that is revoked after receiving the revocation request. After receiving response information indicating that the distributed lock management and control node successfully allocates a distributed lock of the target metadata, the proxy node matches a lock identifier of the distributed lock of the target metadata in the response information with the stored revoked lock identifier. If the matching is successful, the proxy node discards the distributed lock of the target metadata corresponding to the response information.

Figure 4:
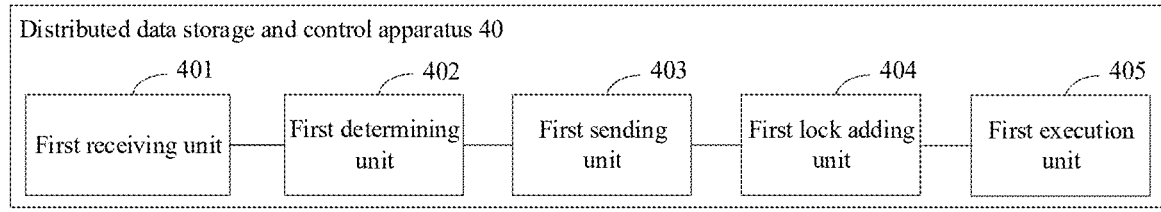
FIG. 4 is a schematic block diagram of a structure of a distributed data storage control apparatus according to an embodiment of the present disclosure.

Corresponding to the distributed data storage control method in the embodiment shown in FIG. 2, FIG. 4 is a schematic block diagram of a structure of a distributed data storage control apparatus according to an embodiment of the present disclosure. For ease of illustration, only parts related to the embodiment of the present disclosure are shown. Referring to FIG. 4, the distributed data storage control apparatus 40 includes a first receiving unit 401, a first determining unit 402, a first sending unit 403, a first lock adding unit 404, and a first execution unit 405.

The first receiving unit 401 is configured to receive, through a proxy node, an access request for a target file in a network attached storage (NAS) cluster, and determine target metadata corresponding to the access request;

the first determining unit 402 is configured to determine, through the proxy node and based on metadata of the target file and distributed lock setting information, whether the target metadata needs to be synchronously valid with a distributed lock of the target metadata;

the first sending unit 403 is configured to: if determining that the target metadata needs to be synchronously valid with the distributed lock of the target metadata, if the proxy node determines, according to an attribute value of the distributed lock of the target metadata, that a current distributed lock of the target metadata is invalid, send a first lock request to a distributed lock management and control node, where the first lock request is used to request to reallocate a distributed lock of the target metadata for the target metadata, and the distributed lock of the target metadata is used to control exclusive access to the target metadata shared in the NAS cluster;

the first lock adding unit 404 is configured to: configure, through the distributed lock management and control node and in response to receiving the first lock request, the distributed lock of the target metadata for the access request, and return response information to the proxy node, where the response information indicates that the distributed lock of the target metadata is successfully configured for the access request; and the first execution unit 405 is configured to control, based on the distributed lock of the target metadata, the access request for the target file in the NAS cluster.

In some embodiments, the first execution unit 404 is further configured to:

in response to completing updating of the target metadata by executing the access request, cache, through the proxy node, the updated target metadata, and synchronize the updated target metadata to the distributed lock management and control node, where the distributed lock management and control node stores metadata of the target file to provide a metadata access service to the proxy node.

In some embodiments, the first sending unit 403 is further configured to:

if the access request does not directly or indirectly update a file size of the target file, send a first lock request for requesting a distributed read lock of the target metadata to the distributed lock management and control node.

In some embodiments, the first sending unit 403 is further configured to:

in response to determining that the access request directly or indirectly changes a file size of the target file, send a first lock request for requesting a write lock of file size metadata to the distributed lock management and control node.

In some embodiments, the access request is a read request indicating to read content of the target file, the distributed lock of the target metadata is a distributed read lock of file size metadata, the apparatus 40 further includes a range modification unit (not shown in the figure), and the range modification unit, before the first execution unit 405 controls, based on the distributed lock of the target metadata, the access request for the target file in the NAS cluster, is configured to:

detect whether an access range indicated by the read request exceeds a file size of the target file; and in response to detecting that the access range exceeds the file size of the target file, modify the access range corresponding to the access request, such that the modified access range falls within the file size of the target file.

In some embodiments, the access request is a write request for writing file content to the target file, the target metadata is file size metadata, and the file size metadata needs to be synchronously valid with a distributed lock of the file size metadata. The distributed data storage control apparatus 40 further includes a range obtaining unit (not shown in the figure), and the range obtaining unit, before the first sending unit 403 sends the first lock request to the distributed lock management and control node, is configured to:

read, through a distributed read lock of the file size metadata, a first file size of the target file from the distributed lock management and control node; and the first sending unit 403 is further configured to:

in response to determining that a second file size indicated by the write request is greater than the first file size of the target file, send a write lock request of the file size metadata to the distributed lock management and control node;

the first lock adding unit 404 is further configured to:

configure, through the distributed lock management and control node and according to the write lock request of the file size metadata, a distributed write lock of the file size metadata for the write request, and revoke a distributed read lock of the file size metadata and/or a distributed write lock of the file size metadata configured for other access request; and the first execution unit 405 is further configured to:

control, based on the distributed write lock of the file size metadata, writing of the file content to the target file.

In some embodiments, the distributed data storage control apparatus 40 further includes a second execution unit (not shown in the figure), and the second execution unit is configured to:

if the proxy node determines that the distributed lock of the target metadata is valid, control, based on the distributed lock of the target metadata, the access request for the target file in the NAS cluster.

In some embodiments, the distributed data storage control apparatus 40 further includes a third execution unit (not shown in the figure), and the third execution unit is configured to:

in response to determining that the target metadata does not need to be synchronously valid with the distributed lock of the target metadata, generate, through the proxy node, reply information for the access request from the target metadata that is locally cached, where the target metadata that is locally cached is updated periodically.

In some embodiments, the distributed data storage control apparatus 40 further includes a first processing unit (not shown in the figure), and the first processing unit is configured to:

determine, through the proxy node and according to the response information, a lock identifier of the distributed lock of the target metadata, where lock identifiers of different distributed locks of the target metadata are incremented in an order in which the distributed locks of the target metadata are configured;

determine whether the lock identifier of the distributed lock of the target metadata is less than a lock identifier of a distributed lock of the target metadata that held; and if the lock identifier of the distributed lock of the target metadata is less than the lock identifier of the distributed lock of the target metadata that is held, discard the distributed lock of the target metadata indicated by the response information.

In some embodiments, the distributed data storage control apparatus 40 further includes a second processing unit (not shown in the figure), and the second processing unit is configured to:

in response to receiving the response information, determine, through the proxy node and according to a lock identifier of the distributed lock of the target metadata indicated by the response information, whether the distributed lock of the target metadata is a distributed lock of the target metadata that is revoked;

if a determination result is yes, discard the distributed lock of the target metadata.

To implement the foregoing embodiments, an embodiment of the present disclosure further provides an electronic device.

Figure 5:
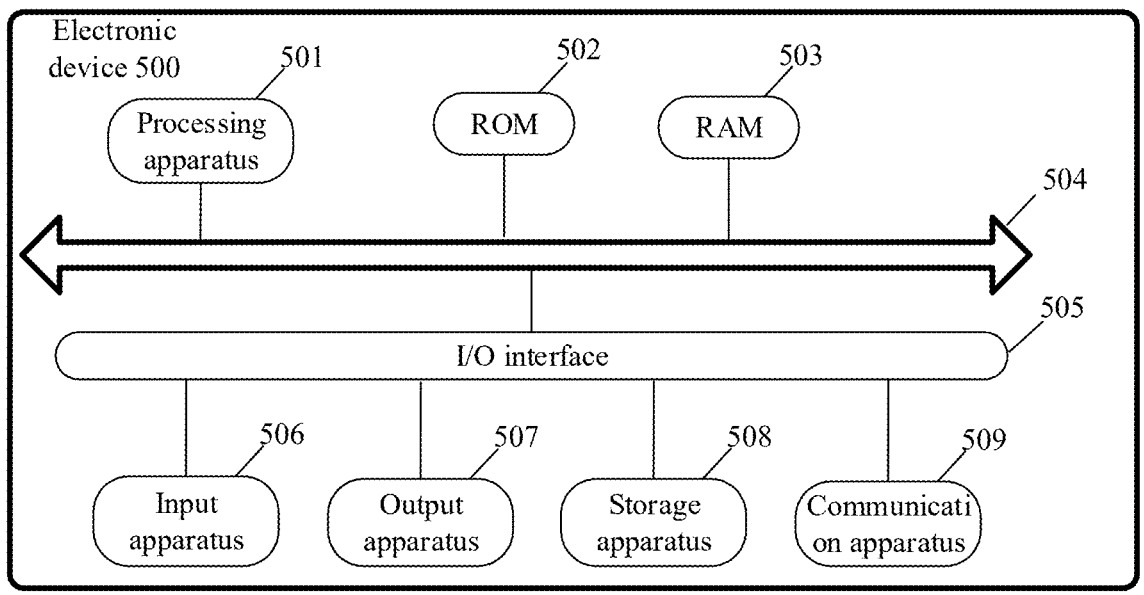
FIG. 5 is a schematic diagram of a hardware structure of an electronic device according to an embodiment of the present disclosure.

Referring to FIG. 5, which is a schematic structural diagram of an electronic device 500 suitable for implementing the embodiments of the present disclosure, and the electronic device 500 may be a terminal device or a server. The terminal device may include, but is not limited to, a mobile terminal such as a mobile phone, a notebook computer, a digital broadcast receiver, a personal digital assistant (Personal Digital Assistant, PDA for short), portable android device (Portable Android Device, PAD for short), a portable media player (Portable Media Player, PMP for short), and a vehicle-mounted terminal (such as a vehicle navigation terminal), and a fixed terminal such as a digital TV and a desktop computer. The electronic device shown in FIG. 5 is merely an example, and shall not impose any limitation on the function and scope of use of the embodiments of the present disclosure.

As shown in FIG. 5, the electronic device 500 may include a processing apparatus (for example, a central processing unit, a graphics processing unit, etc.) 501, which may perform a variety of appropriate actions and processing in accordance with a program stored in a read only memory (Read Only Memory, ROM for short) 502 or a program loaded from a storage apparatus 508 into a random access memory (Random Access Memory, RAM for short) 503. The RAM 503 further stores various programs and data required for the operation of the electronic device 500. The processing apparatus 501, the ROM 502, and the RAM 503 are connected to each other through a bus 504. An input/output (I/O) interface 505 is also connected to the bus 504.

Generally, the following apparatuses may be connected to the I/O interface 505: an input apparatus 506 including, for example, a touch screen, a touchpad, a keyboard, a mouse, a camera, a microphone, an accelerometer, and a gyroscope; an output apparatus 507 including, for example, a liquid crystal display (Liquid Crystal Display, LCD for short), a speaker, and a vibrator; the storage apparatus 508 including, for example, a tape and a hard disk; and a communication apparatus 509. The communication apparatus 509 may allow the electronic device 500 to perform wireless or wired communication with other devices to exchange data. Although FIG. 5 shows the electronic device 500 having various apparatuses, it should be understood that it is not required to implement or have all the shown apparatuses. It may be an alternative to implement or have more or fewer apparatuses.

In particular, according to an embodiment of the present disclosure, the process described above with reference to the flowcharts may be implemented as a computer software program. For example, an embodiment of the present disclosure includes a computer program product, which includes a computer program carried on a computer-readable medium, where the computer program includes a program code (computer-executable instructions) for performing the method shown in the flowchart. In such an embodiment, the computer program may be downloaded from a network through the communication apparatus 509 and installed, installed from the storage apparatus 508, or installed from the ROM 502. When the computer program is executed by the processing apparatus 501, the above-mentioned functions defined in the method of the embodiment of the present disclosure are performed.

It should be noted that the computer-readable medium described above in the present disclosure may be a computer-readable signal medium, a computer-readable storage medium, or a combination thereof. The computer-readable storage medium may be, for example but not limited to, electric, magnetic, optical, electromagnetic, infrared, or semiconductor systems, apparatuses, or devices, or any combination thereof. A more specific example of the computer-readable storage medium may include, but is not limited to: an electrical connection having one or more wires, a portable computer magnetic disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In the present disclosure, the computer-readable storage medium may be any tangible medium containing or storing a program which may be used by or in combination with an instruction execution system, an apparatus, or a device. In the present disclosure, the computer-readable signal medium may include a data signal propagated in a baseband or as a part of a carrier, where the data signal carries a computer-readable program code. The propagated data signal may be in various forms, including but not limited to an electromagnetic signal, an optical signal, or any suitable combination thereof. The computer-readable signal medium may also be any computer-readable medium other than the computer-readable storage medium. The computer-readable signal medium can send, propagate, or transmit a program used by or in combination with the instruction execution system, the apparatus, or the device. The program code contained in the computer-readable medium may be transmitted by any suitable medium, including but not limited to: electric wires, optical cables, radio frequency (RF), and the like, or any suitable combination thereof.

The foregoing computer-readable medium may be contained in the foregoing electronic device. Alternatively, the computer-readable medium may exist independently, without being assembled into the electronic device.

The foregoing computer-readable medium carries one or more programs that, when executed by the electronic device, cause the electronic device to perform the method shown in the foregoing embodiments.

The computer program code for performing the operations of the present disclosure may be written in one or more programming languages or a combination thereof, where the programming languages include object-oriented programming languages such as Java, Smalltalk, and C++, and further include conventional procedural programming languages such as "C" language or similar programming languages. The program code may be completely executed in a computer of a user, partially executed in a computer of a user, executed as an independent software package, partially executed in a computer of a user and partially executed in a remote computer, or completely executed in a remote computer or server. In the case involving the remote computer, the remote computer may be connected to a computer of a user through any type of network, including a local area network (local Area Network, LAN for short) or a wide area network (local Area Network, LAN for short), or may be connected to an external computer (for example, connected through the Internet by an Internet service provider).

The flowcharts and the block diagrams in the accompanying drawings illustrate possibly implemented architecture, functions, and operations of the system, the method, and the computer program product according to various embodiments of the present disclosure. In this regard, each block in the flowchart or the block diagram may represent a module, a program segment, or part of codes, and the module, the program segment, or part of the codes contain one or more executable instructions for implementing the specified logical functions. It should also be noted that, in some alternative implementations, the functions marked in the blocks may also occur in an order different from that marked in the accompanying drawings. For example, two blocks shown in succession can actually be executed substantially in parallel, or they can sometimes be executed in a reverse order, depending on the functions involved. It should also be noted that each block in the block diagram and/or the flowchart, and a combination of the blocks in the block diagram and/or the flowchart may be implemented by a dedicated hardware-based system that executes specified functions or operations, or may be implemented by a combination of dedicated hardware and computer instructions.

The related units described in the embodiments of the present disclosure may be implemented by means of software, or may be implemented by means of hardware. A name of a unit does not constitute a limitation on the unit itself in some cases.

The functions described herein above may be performed at least partially by one or more hardware logic components. For example, without limitation, exemplary types of hardware logic components that may be used include: a field programmable gate array (FPGA), an application-specific integrated circuit (ASIC), an application-specific standard product (ASSP), a system on chip (SOC), a complex programmable logic device (CPLD), and the like.

In the context of the present disclosure, a machine-readable medium may be a tangible medium that may contain or store a program used by or in combination with the instruction execution system, the apparatus, or the device. The machine-readable medium may be a machine-readable signal medium or a machine-readable storage medium. The machine-readable medium may include, but is not limited to, electronic, magnetic, optical, electromagnetic, infrared, or semiconductor systems, apparatuses, or devices, or any suitable combination thereof. A more specific example of the machine-readable storage medium may include an electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof.

The foregoing descriptions are merely preferred embodiments of the present disclosure and explanations of the applied technical principles. A person skilled in the art should understand that the scope of disclosure involved in the present disclosure is not limited to the technical solution formed by a specific combination of the foregoing technical features, and shall also cover other technical solutions formed by any combination of the foregoing technical features or equivalent features thereof without departing from the foregoing concept of disclosure, for example, a technical solution formed by replacing the foregoing features with technical features with similar functions disclosed in the present disclosure (but not limited thereto).

In addition, although the various operations are depicted in a specific order, it should be understood as requiring these operations to be performed in the specific order shown or in a sequential order. Under certain circumstances, multitasking and parallel processing may be advantageous. Similarly, although several specific implementation details are included in the foregoing discussions, these details should not be construed as limiting the scope of the present disclosure. Some features that are described in the context of separate embodiments can also be implemented in combination in a single embodiment. In contrast, various features described in the context of a single embodiment may also be implemented in a plurality of embodiments individually or in any suitable sub-combination.

Although the subject matter has been described in a language specific to structural features and/or logical actions of the method, it should be understood that the subject matter defined in the appended claims is not necessarily limited to the specific features or actions described above. In contrast, the specific features and actions described above are merely exemplary forms of implementing the claims.

What is claimed is:

1. A distributed data storage control method, comprising:
   receiving, through a proxy node, an access request for a target file in a network attached storage (NAS) cluster, and determining target metadata corresponding to the access request;
   determining, through the proxy node and based on metadata of the target file and distributed lock setting information, whether the target metadata needs to be synchronously valid with a distributed lock of the target metadata;
   when determining that the target metadata needs to be synchronously valid with the distributed lock of the target metadata, based on that the proxy node determines, according to an attribute value of the distributed lock of the target metadata, that a current distributed lock of the target metadata is invalid, sending a first lock request to a distributed lock management and control node, wherein the first lock request is used to request to reallocate a distributed lock of the target metadata for the target metadata, and the distributed lock of the target metadata is used to control exclusive access to the target metadata shared in the NAS cluster;
   configuring, through the distributed lock management and control node and in response to receiving the first lock request, the distributed lock of the target metadata for the access request, and returning response information to the proxy node, wherein the response information indicates that the distributed lock of the target metadata is successfully configured for the access request;
   controlling, based on the distributed lock of the target metadata, the access request for the target file in the NAS cluster.

2. The method according to claim 1, wherein the method further comprises:
   in response to completing updating of the target metadata by executing the access request, caching, through the proxy node, the updated target metadata, and synchronizing the updated target metadata to the distributed lock management and control node, wherein the distributed lock management and control node stores metadata of the target file to provide a metadata access service to the proxy node.

3. The method according to claim 1, wherein the when determining that the target metadata needs to be synchronously valid with the distributed lock of the target metadata, based on that the proxy node determines, according to the attribute value of the distributed lock of the target metadata, that the current distributed lock of the target metadata is invalid, sending the first lock request to the distributed lock management and control node comprises:
   when the access request does not directly or indirectly update a file size of the target file, sending a first lock request for requesting a distributed read lock of the target metadata to the distributed lock management and control node.

4. The method according to claim 1, wherein the when determining that the target metadata needs to be synchronously valid with the distributed lock of the target metadata, based on that the proxy node determines, according to the attribute value of the distributed lock of the target metadata, that the current distributed lock of the target metadata is invalid, sending the first lock request to the distributed lock management and control node comprises:
   in response to determining that the access request directly or indirectly changes a file size of the target file, sending a first lock request for requesting a write lock of file size metadata to the distributed lock management and control node.

5. The method according to claim 1, wherein the access request is a read request indicating to read content of the target file, the distributed lock of the target metadata is a distributed read lock of file size metadata, and before controlling, based on the distributed lock of the target metadata, the access request for the target file in the NAS cluster, the method further comprises:
  detecting whether an access range indicated by the read request exceeds a file size of the target file;
  in response to detecting that the access range exceeds the file size of the target file, modifying the access range corresponding to the access request, such that a modified access range falls within the file size of the target file.

6. The method according to claim 1, wherein the access request is a write request for writing file content to the target file, the target metadata is file size metadata, and the file size metadata needs to be synchronously valid with a distributed lock of the file size metadata; before sending the first lock request to the distributed lock management and control node, the method further comprises:
  reading, through a distributed read lock of the file size metadata, a first file size of the target file from the distributed lock management and control node; and the sending the first lock request to the distributed lock management and control node comprises:
  in response to determining that a second file size indicated by the write request is greater than the first file size of the target file, sending a write lock request of the file size metadata to the distributed lock management and control node;
  the configuring, through the distributed lock management and control node and in response to receiving the first lock request, the distributed lock of the target metadata for the access request comprises:
  configuring, through the distributed lock management and control node and according to the write lock request of the file size metadata, a distributed write lock of the file size metadata for the write request, and revoking a distributed read lock of the file size metadata and/or a distributed write lock of the file size metadata configured for other access request;
  the controlling, based on the distributed lock of the target metadata, the access request for the target file in the NAS cluster comprises:
  controlling, based on the distributed write lock of the file size metadata, writing of the file content to the target file.

7. The method according to claim 1, wherein the method further comprises:
  when the proxy node determines that the distributed lock of the target metadata is valid, controlling, based on the distributed lock of the target metadata, the access request for the target file in the NAS cluster.

8. The method according to claim 1, wherein the method further comprises:
  in response to determining that the target metadata does not need to be synchronously valid with the distributed lock of the target metadata, generating, through the proxy node, reply information for the access request from the target metadata that is locally cached,
  wherein the target metadata that is locally cached is updated periodically.

9. The method according to claim 1, wherein the method further comprises:
  determining, through the proxy node and according to the response information, a lock identifier of the distributed lock of the target metadata, wherein lock identifiers of different distributed locks of the target metadata are incremented in an order in which the distributed locks of the target metadata are configured;
  determining whether the lock identifier of the distributed lock of the target metadata is less than a lock identifier of a distributed lock of the target metadata that is held;
  when the lock identifier of the distributed lock of the target metadata is less than the lock identifier of the distributed lock of the target metadata that is held, discarding the distributed lock of the target metadata indicated by the response information.

10. The method according to claim 1, wherein the method further comprises:
  in response to receiving the response information, determining, through the proxy node and according to a lock identifier of the distributed lock of the target metadata indicated by the response information, whether the distributed lock of the target metadata is a distributed lock of the target metadata that is revoked;
  when the distributed lock of the target metadata is a distributed lock of the target metadata that is revoked, discarding the distributed lock of the target metadata.

11. A distributed data storage control apparatus, comprising:
  a processor and a memory,
  wherein the memory stores a computer-executable instruction;
  the computer-executable instruction, when executed by the processor, causes the processor to:
  receive, through a proxy node, an access request for a target file in a network attached storage (NAS) cluster, and determine target metadata corresponding to the access request;
  determine, through the proxy node and based on metadata of the target file and distributed lock setting information, whether the target metadata needs to be synchronously valid with a distributed lock of the target metadata;
  when determining that the target metadata needs to be synchronously valid with the distributed lock of the target metadata, based on that the proxy node determines, according to an attribute value of the distributed lock of the target metadata, that a current distributed lock of the target metadata is invalid, send a first lock request to a distributed lock management and control node, wherein the first lock request is used to request to reallocate a distributed lock of the target metadata for the target metadata, and the distributed lock of the target metadata is used to control exclusive access to the target metadata shared in the NAS cluster;
  configure, through the distributed lock management and control node and in response to receiving the first lock request, the distributed lock of the target metadata for the access request, and return response information to the proxy node, wherein the response information indicates that the distributed lock of the target metadata is successfully configured for the access request;
  control, based on the distributed lock of the target metadata, the access request for the target file in the NAS cluster.

12. The apparatus according to claim 11, wherein the processor is further caused to:
  in response to completing updating of the target metadata by executing the access request, cache, through the proxy node, the updated target metadata, and synchronize the updated target metadata to the distributed lock management and control node, wherein the distributed lock management and control node stores metadata of the target file to provide a metadata access service to the proxy node.

13. The apparatus according to claim 11, wherein when determining that the target metadata needs to be synchronously valid with the distributed lock of the target metadata, based on that the proxy node determines, according to the attribute value of the distributed lock of the target metadata, that the current distributed lock of the target metadata is invalid, sending the first lock request to the distributed lock management and control node, the processor is specifically configured to:

when the access request does not directly or indirectly update a file size of the target file, send a first lock request for requesting a distributed read lock of the target metadata to the distributed lock management and control node.

14. The apparatus according to claim 11, wherein when determining that the target metadata needs to be synchronously valid with the distributed lock of the target metadata, based on that the proxy node determines, according to the attribute value of the distributed lock of the target metadata, that the current distributed lock of the target metadata is invalid, sending the first lock request to the distributed lock management and control node, the processor is specifically configured to:

in response to determining that the access request directly or indirectly changes a file size of the target file, send a first lock request for requesting a write lock of file size metadata to the distributed lock management and control node.

15. The apparatus according to claim 11, wherein the access request is a read request indicating to read content of the target file, the distributed lock of the target metadata is a distributed read lock of file size metadata, before controlling, based on the distributed lock of the target metadata, the access request for the target file in the NAS cluster, the processor is further caused to:

detect whether an access range indicated by the read request exceeds a file size of the target file;

in response to detecting that the access range exceeds the file size of the target file, modify the access range corresponding to the access request, such that a modified access range falls within the file size of the target file.

16. The apparatus according to claim 11, wherein the access request is a write request for writing file content to the target file, the target metadata is file size metadata, and the file size metadata needs to be synchronously valid with a distributed lock of the file size metadata; before sending the first lock request to the distributed lock management and control node, the processor is further caused to:

read, through a distributed read lock of the file size metadata, a first file size of the target file from the distributed lock management and control node; and when sending the first lock request to the distributed lock management and control node, the processor specifically configured to:

in response to determining that a second file size indicated by the write request is greater than the first file size of the target file, send a write lock request of the file size metadata to the distributed lock management and control node;

when configuring, through the distributed lock management and control node and in response to receiving the first lock request, the distributed lock of the target metadata for the access request, the processor specifically configured to:

configure, through the distributed lock management and control node and according to the write lock request of the file size metadata, a distributed write lock of the file size metadata for the write request, and revoke a distributed read lock of the file size metadata and/or a distributed write lock of the file size metadata configured for other access request;

when controlling, based on the distributed lock of the target metadata, the access request for the target file in the NAS cluster, the processor specifically configured to:

control, based on the distributed write lock of the file size metadata, writing of the file content to the target file.

17. The apparatus according to claim 11, wherein the processor is further caused to:

when the proxy node determines that the distributed lock of the target metadata is valid, control, based on the distributed lock of the target metadata, the access request for the target file in the NAS cluster.

18. The apparatus according to claim 11, wherein the processor is further caused to:

in response to determining that the target metadata does not need to be synchronously valid with the distributed lock of the target metadata, generate, through the proxy node, reply information for the access request from the target metadata that is locally cached, wherein the target metadata that is locally cached is updated periodically.

19. The apparatus according to claim 11, wherein the processor is further caused to:

determine, through the proxy node and according to the response information, a lock identifier of the distributed lock of the target metadata, wherein lock identifiers of different distributed locks of the target metadata are incremented in an order in which the distributed locks of the target metadata are configured;

determine whether the lock identifier of the distributed lock of the target metadata is less than a lock identifier of a distributed lock of the target metadata that is held;

when the lock identifier of the distributed lock of the target metadata is less than the lock identifier of the distributed lock of the target metadata that is held, discard the distributed lock of the target metadata indicated by the response information.

20. A non-transitory computer-readable storage medium, wherein the computer-readable storage medium stores a computer-executable instruction which, when executed by a processor, implements the following:

receiving, through a proxy node, an access request for a target file in a network attached storage (NAS) cluster, and determining target metadata corresponding to the access request;

determining, through the proxy node and based on metadata of the target file and distributed lock setting information, whether the target metadata needs to be synchronously valid with a distributed lock of the target metadata;

when determining that the target metadata needs to be synchronously valid with the distributed lock of the target metadata, based on that the proxy node determines, according to an attribute value of the distributed lock of the target metadata, that a current distributed lock of the target metadata is invalid, sending a first lock request to a distributed lock management and control node, wherein the first lock request is used to request to reallocate a distributed lock of the target metadata for the target metadata, and the distributed lock of the target metadata is used to control exclusive access to the target metadata shared in the NAS cluster;

configuring, through the distributed lock management and control node and in response to receiving the first lock request, the distributed lock of the target metadata for the access request, and returning response information to the proxy node, wherein the response information indicates that the distributed lock of the target metadata is successfully configured for the access request;

controlling, based on the distributed lock of the target metadata, the access request for the target file in the NAS cluster.

* * * * *